United States Patent [19]

Bodenhamer

[11] 4,222,654

[45] Sep. 16, 1980

[54] CAMERA ADAPTER BRACKET

[76] Inventor: Donald J. Bodenhamer, 8064 Deverow Ct., Lewisville, N.C. 27023

[21] Appl. No.: 44,508

[22] Filed: Jun. 1, 1979

[51] Int. Cl.³ ............................................. G03B 17/00
[52] U.S. Cl. .................................................... 354/293
[58] Field of Search .................... 354/75, 76, 81, 293, 354/6; 346/110 R; 355/1

[56] References Cited

U.S. PATENT DOCUMENTS 3,149,903   9/1964   Merrick ........................ 346/110 R Primary Examiner—John Gonzales

[57] ABSTRACT

A camera support for adaption to a cathode ray tube for positioning a camera in a proper orientation to view and be capable of taking pictures of portions or the entire display on a cathode ray tube while retaining the camera in a stable condition.

4 Claims, 4 Drawing Figures

CAMERA ADAPTER BRACKET

BACKGROUND AND OBJECTIVES OF THE INVENTION

The use of photography in electron microscopy, nuclear medicine, and in the application of ultrasonics in medical clinical techniques has become a highly significant aid in diagnostics. Presently photographing signal traces are being achieved by utilizing one model of a Hewlett Packard camera and camera accessory and adapter installation, Model 10375A. While substantially instantaneous results may be obtained employing self-developing pictures, it has been found highly desirable to take a sequence of pictures which have high fidelity, sharpness and clarity from which prints, film and slides may be made for accurate analysis, teaching purposes and medical records, particularly in clinical application of sonography, radiography, diagnostic nuclear medicine, and electron microscopy which areas are not optimally achieved utilizing self-developing photography. While self-developing photography is highly suitable for some purposes, it does not fulfill the broad range and demand necessitated by a broad range of clinical applications in the aforementioned technologies.

It is, therefore, an objective of this invention to provide an apparatus for supporting a 35mm camera or a motion picture camera at a predetermined position relative to the viewing surface of a cathode ray tube employed in conjunction with apparatus for utilizing ultrasonics, electron or nuclear testing and displaying procedures.

Another objective of this invention is the provision of an apparatus for supporting a camera whether for skilled photographs or motion pictures to be taken in close proximity to the viewing face of a cathode ray tube in rapid sequence or at timed intervals whether of the entire viewing area or only a portion of the cathode ray tube display.

Yet another objective of this invention is the provision of a totally adjustable camera supporting apparatus in which a camera may be positioned and maintained at a selected viewing location and retained in a fixed position for a series of photographs and rapidly repositioned to another orientation depending upon the specific requirements and the tests to be recorded from the display on the cathode ray tube to which the apparatus is mounted.

Other objectives and many of the attendant advantages will become more readily apparent to those skilled in the photography art taken in conjunction with the accompanying drawings, detailed description, and appended claims in which mechanical equivalents are contemplated.

DETAILED DESCRIPTION OF A PREFERRED EMBODIMENT OF THE INVENTION

Figure 1:
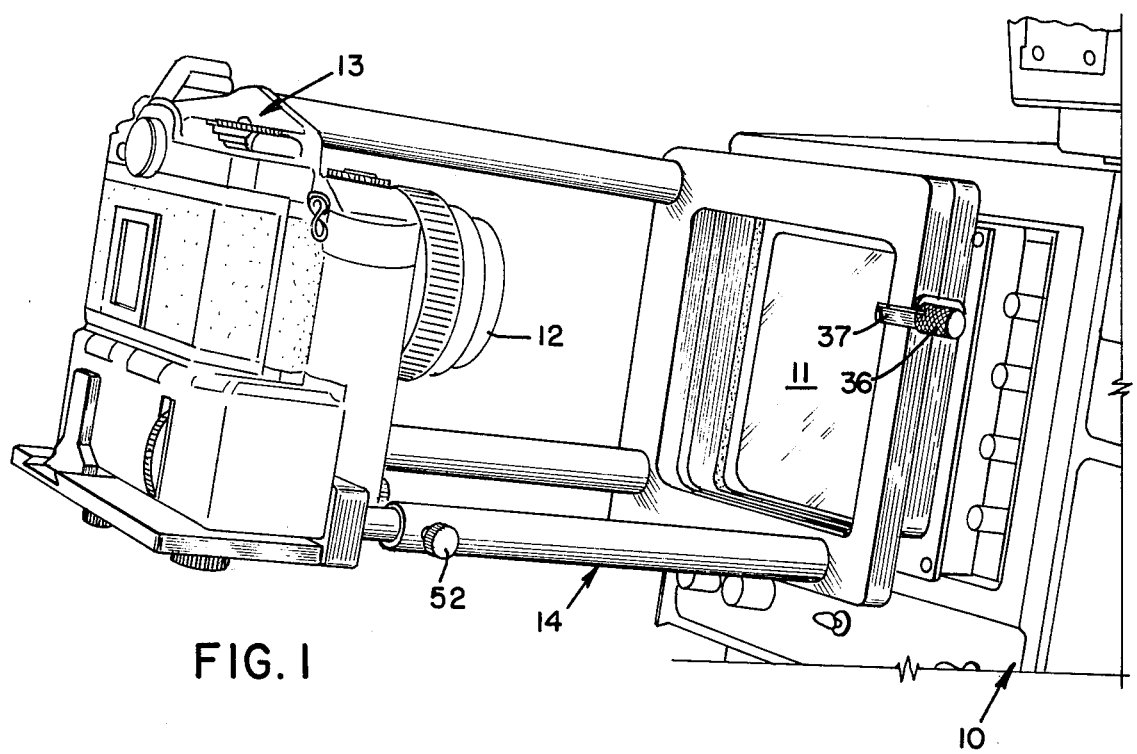
FIG. 1 is a side perspective view of a camera support on which a camera is mounted in position for viewing and in the picture-taking position relative to the viewing area of a cathode ray tube display console that is shown only partially.
Figure 2:
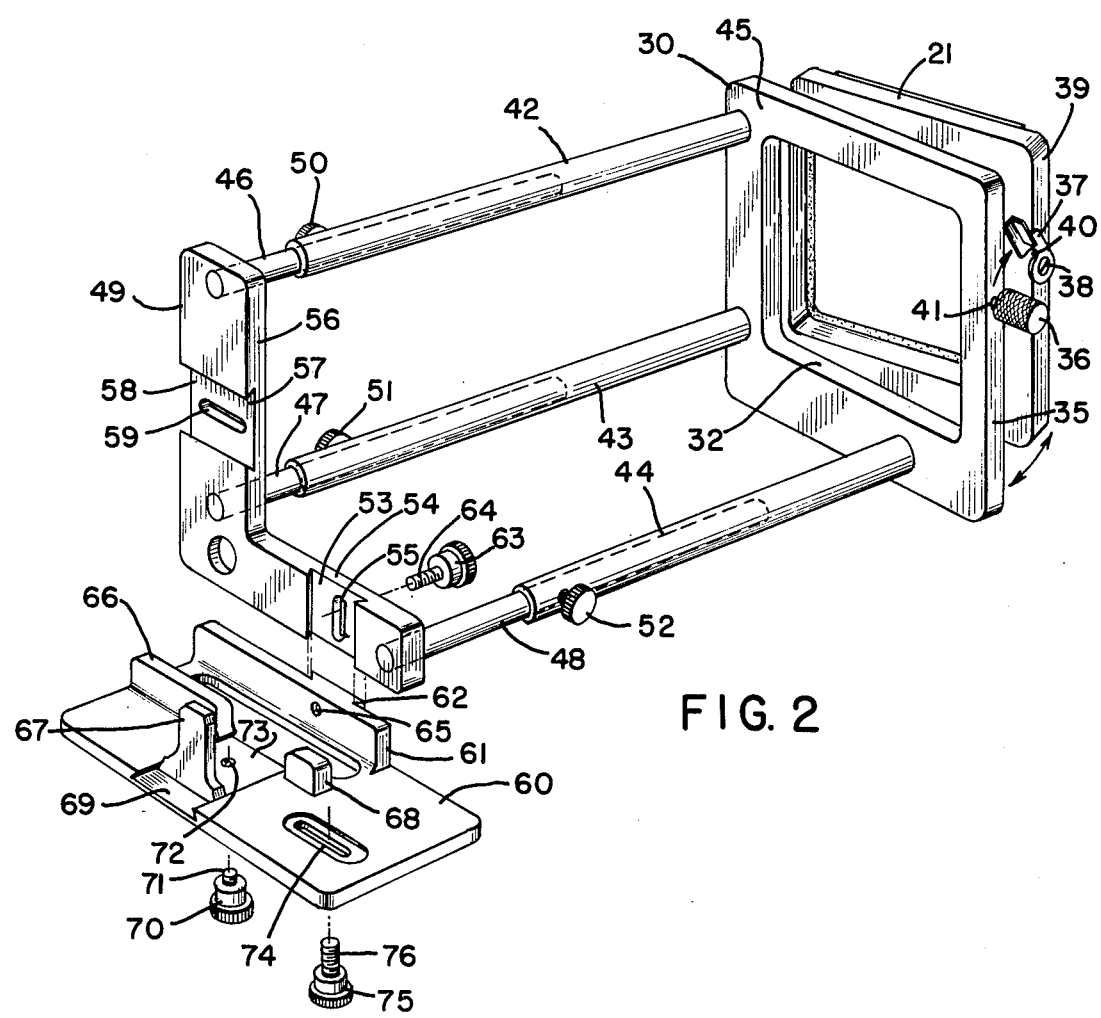
FIG. 2 is an exploded side perspective view of the camera support of FIG. 1 in a pivoted and extended position with component elements shown in perspective also.
Figure 3:
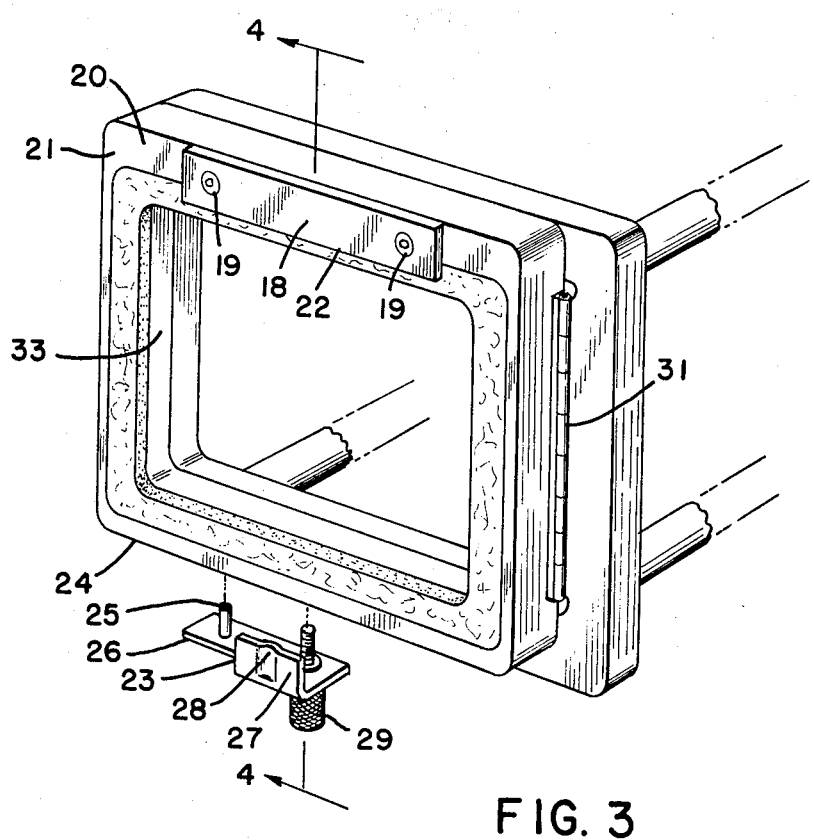
FIG. 3 is a partial right end perspective view of the camera support with detached bezel connecting bracket with a portion removed.
Figure 4:
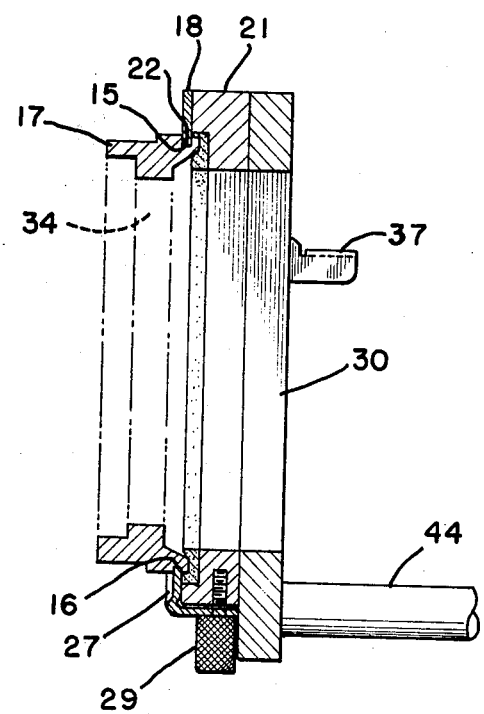
FIG. 4 is a partial transverse sectional view taken substantially along line 4—4 of FIG. 3 with the bezel connecting bracket in position supporting a bezel mounted to the frame of a cathode ray tube display console.

Referring to the drawing and particularly to FIG. 1, there is illustrated, in outline form only, a console 10 for an ultrasonic diagnostic apparatus in which there is a cathode ray tube (CRT) 11 with the viewing screen surface area exposed in line with the lens 12 of the 35 mm camera 13 securely mounted on the camera support 14. The camera support 14 is secured releasably to indentations 15 and 16 in the bezel 17 that is mounted to the frame of the console 10 surrounding the CRT, as shown in FIG. 4. The bezel-clamping flange 18 is suitably secured by means of the screws 19 to the face side 20 of the camera support frame 21 with the lower edge 22 of the flange 18 extending into the recess 15. The releasable bezel locking member 23 is secured to the bottom 24 of the supporting frame 21 by means of the rivet 25 to which the spring clip 26 is secured. The clip 26 is provided with an upturned flange 27 having a medial indentation 28 for exerting a compensating shim in the bezel recess 16. The clip 26 is provided with a threaded thumb screw 29 that is threadably engaged to the bottom 24 of the frame 21 to lock the frame to the bezel 17 releasably as shown in FIG. 4.

A camera supporting bracket 30 is hingedly connected by means of the hinge 31 along one side thereof to the camera support frame 21 permitting the camera supporting bracket to pivot about the hinge 31 relative to the frame 21. The bracket 30 is substantially rectangular and is provided with a rectangular opening 32 which is substantially of the same area and configuration as the opening 33 in the support frame 21 which may be of the same size opening 34 in the bezel 17 for a clear, unobstructed view of the CRT 11. At the opposite side 35 of the bracket 30 is a knurled thumb screw 36 which is threadably retained in the side 35 for releasably locking the latch hook lever member 37 that is pivotally connected through retaining screw 38 to the frame side 39. The hook 40 of the latch 37 will engage with the reduced stem 41 on the thumb screw 36 for retention thereby upon appropriate rotation of the thumb screw 36 thereby releasably locking the bracket 30 to the frame 21. In some procedures, the bracket 30 may be pivoted away from the frame 21 by releasing the latch 37.

Horizontally extending tubular members or sleeves 42, 43 and 44 are securely mounted to the bracket 30 and extend from the rear bracket face 45 with each of the sleeves 42–44 being either welded in position or keyed in drilled openings in the bracket 30 and locked in position by suitable set screws (not shown). Each of the sleeves 42–44 may be provided with longitudinally-extending slots (not shown) for cooperatively receiving a depending lug (not shown) mounted on each of the rods 48 which are telescopically received in the sleeves 42, 43 and 44, respectively. Rods 46–48 are securely mounted on the angle camera supporting member 49 whether by welding or other suitable means with each of the rods 46–48 being in alignment with the corresponding cooperating sleeves 42–44 for slidable movement inwardly and outwardly for positioning of the camera supporting plate 49. Rod locking screws 50, 51 and 52 are threadably retained on each of the sleeves 42, 43 and 44 to engage the rods 46, 47 and 48 to lock them in position at the selected distance in positioning the lens 12 of the camera 13 relative to the CRT 11.

The camera supporting plate 49 is provided with a vertical camera mount-receiving guideway 53 the medial portion 54 thereof being provided with an elongated vertical slot 55. The vertical leg 56 of the plate 49 is provided with a horizontal guideway 57 the medial portion 58 of which is provided with a horizontally elongated slot 59. A camera mount member 60 having an upstanding flange 61 is provided with a cooperating guideway 62 for slidable engagement within the guideway 53 for vertical adjustable displacement and releasable locking in position through the knurled thumb screw 63, the threaded end 64 of which passes through the elongated slot 55 for threaded engagement with the threaded opening 65 in the upstanding flange 61. Vertically spaced-apart and upstanding camera-engaging lugs 68 are suitably positioned on the camera mount member 60 for engaging and cradling the camera 13 on the camera mount member 60 with the upstanding lug 67 being displaceable within the raceway 69 for horizontal adjustment and releasable locking engagement through the threaded thumb screw 70 in which the threaded end 71 will engage the threaded opening 72 on the lug web 73. The elongated slot 74 in the camera mount member 60 will cooperatively receive the camera retaining screw 75 with the threaded end 76 being threadably joined to the threaded adapter in the camera base for releasably locking the camera in position on the camera mount member 60.

As shown in FIG. 1, the camera 13 is mounted in the horizontal position for vertical displacement on the camera mount member 60 with the lever 37 in the locked position for retaining the camera supporting bracket in the position shown. Alternatively, the camera mount member 60 may be positioned in a vertical position within the guideway 57 to present a modified view of the subject to be photographed on the CRT 11. The distance between the camera lens 12 and the CRT 11 may be adjusted readily by loosening the thumb screws 50, 51 and 52 and extending or retracting the camera mount member 60 by the telescoping action of the rods 46, 47 and 48 within the sleeves 42, 43 and 44 before locking the thumb screws 50, 51 and 52 in the desired position.

It will be readily apparent that the actual configuration of the individual members may vary depending upon the particular type of camera and the type of bezel employed. Furthermore, a plurality of telescoping members may be substituted for a sliding guideway which is contemplated.

The camera may be of any desired make and a movie camera may be substituted with appropriate adjustments to be made in the mounting means. Remote as well as time-controlled photographs may be taken or a rapid sequence taken depending upon the particular requirements and utilization of the apparatus employing the CRT 11.

I claim:

1. A camera support on which a camera is mounted for adaptation to a cathode ray tube having a bezel exposing said cathode ray tube in which the bezel is releasably secured to the frame of the cathode ray tube comprising; a camera support frame having means for mounting to said bezel, said camera support frame having an opening therein to expose said cathode ray tube in juxtaposition therewith, a camera supporting bracket pivotally connected to said camera support frame and having an opening therein complementing and substantially coextensive with said opening in said camera support frame, locking means for clamping said camera supporting bracket and said camera support frame together, a camera supporting means on which a camera is mounted and spaced from said camera supporting bracket, means for adjusting the spacing of said camera supporting means having a camera mounted thereon relative to said cathode ray tube, said camera supporting means having a plate, said plate having a viewing area at least comparable to said opening in said camera supporting bracket, a camera guide means on which the camera is mounted, and means on said guide means cooperating with said plate for adjusting the position of said camera vertically and horizontally.

2. A camera support as claimed in claim 1, said means for adjusting the spacing of said camera supporting means including telescoping means connecting said camera supporting bracket and said camera supporting means, and releasable locking means on said telescoping means to clamp said telescoping means in a selected camera viewing position spaced from the cathode ray tube.

3. A camera support as claimed in claim 2, said telescoping means including a linearly-extending tubular member secured to said camera supporting bracket, and a linearly-extending rod mounted on said camera supporting means for slidable engagement in said tubular member, and a releasable locking clamp on said tubular member for engaging said rod to retain said camera supporting means at a preselected position relative to the camera supporting bracket.

4. A camera support as claimed in claim 3, a camera supporting means having a plate for supporting a camera thereon, said plate being slidably mounted on said camera supporting means, and means for releasably clamping said plate to said camera supporting means in a selected position on said camera supporting means.

* * * * *